US012366167B2

(12) United States Patent
Monzon et al.

(10) Patent No.: US 12,366,167 B2
(45) **Date of Patent: *Jul. 22, 2025**

(54) FAN BLADE OR VANE WITH IMPROVED BIRD IMPACT CAPABILITY

(71) Applicant: RTX Corporation, Farmington, CT (US)

(72) Inventors: Byron R. Monzon, Muskego, WI (US); Bronwyn Power, New Haven, CT (US); Michael M. Joly, Hebron, CT (US); Jason H. Elliott, Huntington, IN (US); Xuetao Li, South Glastonbury, CT (US); Christopher Beaudry Miller, Brooklyn, NY (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,246

(22) Filed: Aug. 18, 2023

(65) Prior Publication Data

US 2024/0052747 A1 Feb. 15, 2024

Related U.S. Application Data

(63) Continuation-in-part of application No. 18/446,078, filed on Aug. 8, 2023.

(Continued)

(51) Int. Cl.
*F01D 5/14* (2006.01)

(52) U.S. Cl.
CPC .......... *F01D 5/141* (2013.01); *F05D 2220/36* (2013.01); *F05D 2240/301* (2013.01); *F05D 2240/305* (2013.01); *F05D 2240/306* (2013.01)

(58) Field of Classification Search
CPC . F01D 5/141; F01D 5/16; F01D 9/041; F01D 5/14; F01D 5/145; F01D 5/142;

(Continued)

(56) References Cited

U.S. PATENT DOCUMENTS 3,565,548 A 2/1971 Fowler et al.
4,123,196 A * 10/1978 Prince, Jr. .............. F04D 21/00 415/181

(Continued)

FOREIGN PATENT DOCUMENTS

EP 3070266 A2 9/2016
EP 3456920 B1 3/2021

(Continued)

OTHER PUBLICATIONS

Search Report issued in European Patent Application No. 23190406.1; Date of Mailing May 21, 2024 (14 pages).

(Continued)

*Primary Examiner* — Eric J Zamora Alvarez
(74) *Attorney, Agent, or Firm* — CANTOR COLBURN LLP

(57) ABSTRACT

A gas turbine engine is provided and includes a first fan blade including a suction surface, a second fan blade comprising a pressure surface and neighboring the first fan blade and a throat region interposed between the suction surface of the first fan blade and the pressure surface of the second fan blade. The throat region includes a passage throat located at a minimum distance between the pressure and suction surfaces. The first and second fan blades are configured such that a pre-compression region is defined in the throat region ahead of the passage throat. Each of the first and second fan blades includes a mean camber line defining a flattened suction surface.

10 Claims, 8 Drawing Sheets

Related U.S. Application Data

(60) Provisional application No. 63/396,464, filed on Aug. 9, 2022.

(58) Field of Classification Search
CPC .......... F01D 5/148; F01D 5/20; F01D 21/045; F01D 5/143; F01D 5/146; F01D 5/147; F01D 5/22; F01D 5/282; F04D 29/324; F04D 29/384; F04D 29/666; F04D 29/544; F05D 2240/301; F05D 2220/36; F05D 2250/70; F05D 2240/304; F05D 2220/32; F05D 2240/30; F05D 2240/303; F05D 2240/306; F05D 2250/713; F05D 2260/961; F05D 2240/302; F05D 2240/305; F05D 2250/71; F05D 2250/72; F05D 2240/124; F05D 2240/122; F05D 2240/121; F05D 2300/603; F05B 2240/301; F02C 7/05; F02K 3/06
See application file for complete search history.

(56) References Cited

U.S. PATENT DOCUMENTS

| | | | | |
|---|---|---|---|---|
| 4,431,376 | A | 2/1984 | Lubenstein et al. | |
| 7,374,403 | B2 * | 5/2008 | Decker | F01D 5/141 416/223 R |
| 7,497,664 | B2 * | 3/2009 | Walter | F01D 5/141 416/DIG. 5 |
| 7,896,619 | B2 | 3/2011 | Hill et al. | |
| 8,668,456 | B2 | 3/2014 | Merriman et al. | |
| 9,051,839 | B2 * | 6/2015 | Senoo | F01D 5/141 |
| 9,957,804 | B2 * | 5/2018 | Chouhan | F01D 5/141 |
| 10,370,976 | B2 | 8/2019 | Quach et al. | |
| 10,539,032 | B2 * | 1/2020 | Soni | F01D 9/041 |
| 10,718,215 | B2 * | 7/2020 | Warikoo | F01D 9/041 |
| 10,859,094 | B2 * | 12/2020 | Hanson | F04D 29/384 |
| 10,865,806 | B2 * | 12/2020 | Veitch | F04D 29/668 |
| 11,378,093 | B2 | 7/2022 | Hanson et al. | |
| 2006/0228206 | A1 | 10/2006 | Decker et al. | |
| 2009/0317227 | A1 * | 12/2009 | Grover | F01D 5/141 415/208.1 |
| 2011/0202321 | A1 | 8/2011 | Lung et al. | |
| 2014/0017089 | A1 | 1/2014 | Ristau et al. | |
| 2017/0130587 | A1 * | 5/2017 | Bhaumik | F01D 5/147 |
| 2017/0175556 | A1 | 6/2017 | Soni et al. | |
| 2018/0119706 | A1 | 5/2018 | Vogiatzis | |
| 2020/0102830 | A1 * | 4/2020 | Gallagher | F02C 3/10 |
| 2020/0141242 | A1 | 5/2020 | Nolcheff et al. | |
| 2020/0158127 | A1 | 5/2020 | Nolcheff et al. | |
| 2020/0182074 | A1 | 6/2020 | Taniguchi et al. | |
| 2020/0232330 | A1 | 7/2020 | Chuang et al. | |
| 2020/0308968 | A1 | 10/2020 | Eryilki et al. | |
| 2021/0207614 | A1 | 7/2021 | Hanson et al. | |
| 2024/0052746 | A1 | 2/2024 | Monzon et al. | |

FOREIGN PATENT DOCUMENTS

| | | |
|---|---|---|
| EP | 3594447 B1 | 4/2021 |
| GB | 2474511 A | 4/2011 |

OTHER PUBLICATIONS

Partial Search Report issued in European Patent Application No. 23190406.1; Application Filing Date Aug. 8, 2023; Date of Mailing Jan. 15, 2024 (13 pages).
Search Report issued in European Patent Application No. 24193423.1; Date of Mailing Jun. 3, 2025 (11 pages).

* cited by examiner

FAN BLADE OR VANE WITH IMPROVED BIRD IMPACT CAPABILITY

CROSS-REFERENCE TO RELATED APPLICATIONS

This application is a Continuation-in-Part of U.S. application Ser. No. 18/446,078 filed Aug. 8, 2023, which claims the benefit of U.S. Application No. 63/396,464 filed Aug. 9, 2022, the disclosures of which are incorporated herein by reference in their entirety.

BACKGROUND

Exemplary embodiments of the present disclosure relate generally to gas turbine engines and, in one embodiment, a fan blade or vane of a gas turbine engine with improved bird impact capability.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or to produce electricity in a generator.

In an aircraft, gas turbine engines can be used to generate thrust for the aircraft and are typically supported in nacelles underneath horizontal wings or in nacelles disposed next to vertical wings. In either case, a concern for gas turbine engine health is the prospect of bird impacts on blades or vanes at leading or forward sections of gas turbine engines. This concern is heightened when certain materials are used for those blades or vanes, such as ceramic matrix composites (CMC), which are particularly susceptible to damage from impacts. A further issue is that modifications to the blades or vanes to mitigate damage from impacts cannot have an excessively negative aerodynamic effect on airflows entering the gas turbine engines.

Accordingly, a need exists for a fan blade or vane of a gas turbine engine with improved bird impact capability and limited negative aerodynamic effects.

BRIEF DESCRIPTION

According to an aspect of the disclosure, a gas turbine engine is provided and includes a first fan blade including a suction surface, a second fan blade comprising a pressure surface and neighboring the first fan blade and a throat region interposed between the suction surface of the first fan blade and the pressure surface of the second fan blade. The throat region includes a passage throat located at a minimum distance between the pressure and suction surfaces. The first and second fan blades are configured such that a pre-compression region is defined in the throat region ahead of the passage throat. Each of the first and second fan blades includes a mean camber line defining a flattened suction surface.

In accordance with additional or alternative embodiments, each of the first and second fan blades includes an airfoil section that is defined on an axisymmetric surface with a symmetry axis of the surface aligned with a gas-path centerline axis.

In accordance with additional or alternative embodiments, each of the first and second fan blades has a symmetric thickness distribution with a single thickness maxima.

According to an aspect of the disclosure, a fan blade of a gas turbine engine is provided and includes a body having an airfoil shape and exhibiting a range of thickness-over-chord (T/B) values of approximately 0.0761 at about 20% span to approximately 0.0465 at about 50% span, an average location of max thickness (LMT) of approximately 0.3778 at about 0-20% span and an average of leading edge (LE) thickness at 10% chord-over-total chord of approximately 0.0494 at 0-20% span.

In accordance with additional or alternative embodiments, in about a 0%-20% span, the airfoil shape exhibits an average T/B of approximately 0.0887 (−8% to +8%), in about a 20%-50% span, the airfoil shape exhibits an average T/B of approximately 0.0596 (−8% to +8%), in about a 50%-90% span, the airfoil shape exhibits an average T/B of approximately 0.0394 (−8% to +8%) and in about a 90% to 100% span, the airfoil shape exhibits an average TB of approximately 0.0296 (−8% to +8%).

In accordance with additional or alternative embodiments, in about a 0%-20% span, the airfoil shape exhibits an average LMT of approximately 0.378 (−8% to +8%), in about a 20%-50% span, the airfoil shape exhibits an average LMT of approximately 0.406 (−8% to +8%), in about a 50%-90% span, the airfoil shape exhibits an average LMT of approximately 0.478 (−8% to +8%) and in about a 90% to 100% span, the airfoil shape exhibits an average LMT of approximately 0.587 (−8% to +8%).

In accordance with additional or alternative embodiments, in about a 0%-20% span, the airfoil shape exhibits an average LE thickness at 10% chord-over-total chord of approximately 0.0494 (−12% to +12%), in about a 20%-50% span, the airfoil shape exhibits an average LE thickness at 10% chord-over-total chord of approximately 0.0292 (−5% to +10%), in about a 50%-90% span, the airfoil shape exhibits an average LE thickness at 10% chord-over-total chord of approximately 0.0198 (−5% to +10%) and in about a 90% to 100% span, the airfoil shape exhibits an average LE thickness at 10% chord-over-total chord of approximately 0.0135 (−8% to +8%).

In accordance with additional or alternative embodiments, the airfoil section exhibits an increasing radial LE angle on a given X-R plane from about a 25% (−5% to +5%) span to about a 75% (−5% to +5%) span.

In accordance with additional or alternative embodiments, the airfoil section exhibits an inflection in the radial LE angle distribution at about the 75% (−5% to +5%) span above which the radial LE angle decreases relative to the angle at about the 75% (−5% to +5%) span.

In accordance with additional or alternative embodiments, the airfoil section exhibits an increasing radial LE angle on a given Y-R plane from about a 35% (−5% to +5%) span to about an 85% (−5% to +5%) span.

In accordance with additional or alternative embodiments, the airfoil section exhibits an inflection in the radial LE angle distribution at about the 85% (−5% to +5%) span above which the radial LE angle decreases relative to the angle at about the 85% (−5% to +5%) span.

In accordance with additional or alternative embodiments, the airfoil section exhibits a thickness-to-chord value at a 10% chord location at about 0% LE span of approximately 0.0688 (−15% to +15%), which tapers to approximately 0.0442 (−12% to +12%) at 11% LE span.

In accordance with additional or alternative embodiments, the airfoil section exhibits a chord distribution that has an inflection point between about 50% and about 70% span, the inflection point having a magnitude approximately 1.45-1.55 times a magnitude of the chord at 0% span, and approximately 1-1.1 times a magnitude of the chord at 100% span.

According to an aspect of the disclosure, an airfoil is provided and includes a suction surface exhibiting droop over a first 5% of airfoil chord, after which a suction surface metal-angle distribution is approximately flat along a flat suction surface region, up to approximately −5% of a chord location where an adjacent airfoil covers the airfoil. Following the flat suction surface region, the suction surface metal-angle distribution exhibits a nearly constant-angle region between −5% and +5% of an airfoil covered-passage starting position. Following the nearly constant-angle region, the suction surface metal-angle distribution is approximately linear along a linear section, except at front and end points of this region, where the linear section blends into the nearly constant-angle region and trailing-edge locations, respectively.

In accordance with additional or alternative embodiments, an increase in a section maximum-thickness is evidenced on a pressure surface only.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
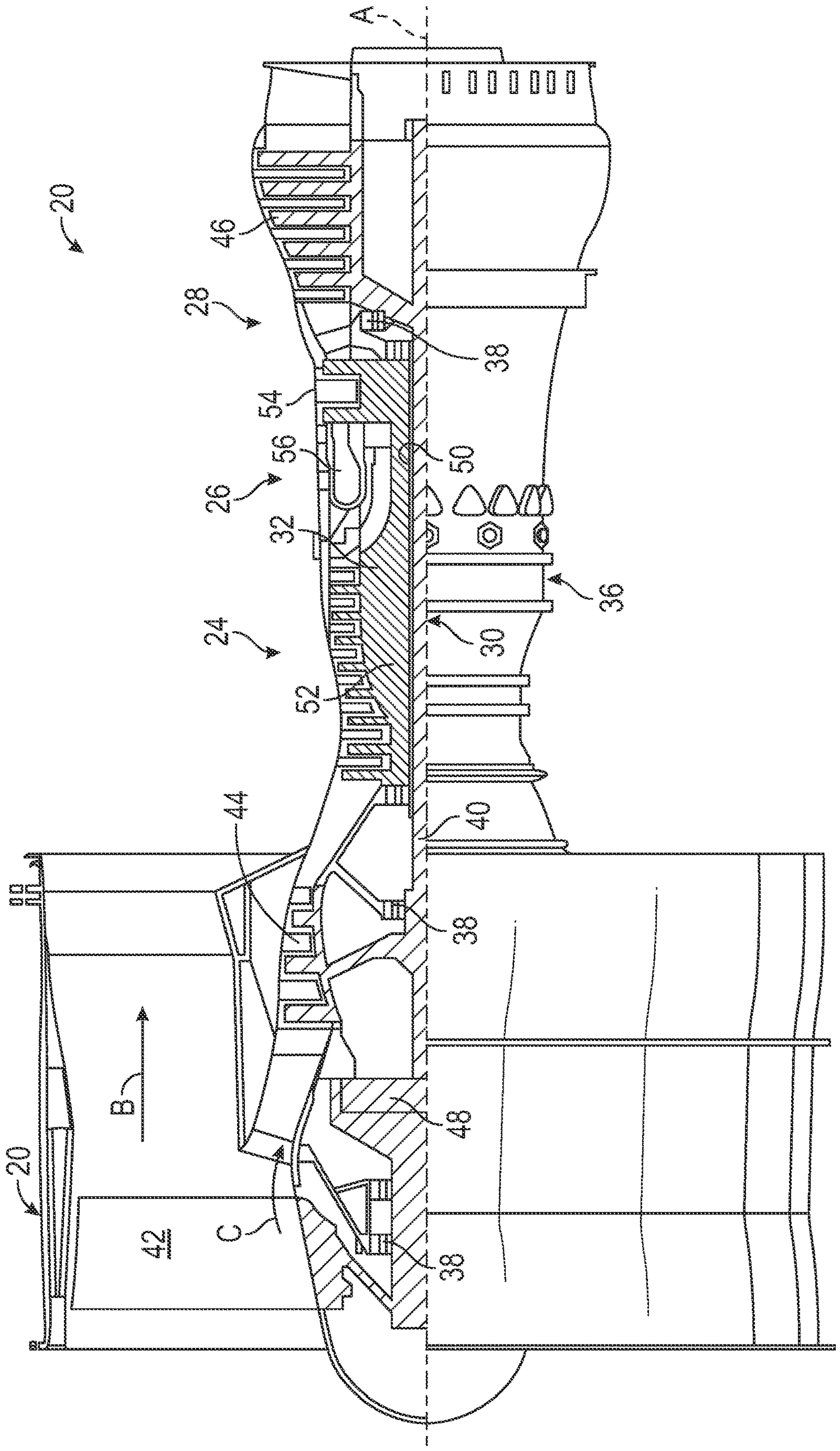
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 m/sec).

As will be described below, a fan blade is provided for use with the gas turbine engine 20 of FIG. 1 as well as other similar assemblies. Fan blades are typically made out of a variety of materials, including metal or fiber composites. When fiber composites are used fan blades, the fan blades need to have increased thickness relative to a metal blade, which tends to result in a decrease in fan efficiency. To make a fan blade out of fiber composite materials that also has a high level of aerodynamic efficiency requires that the thickness, chord and camber distributions of the fan blade all be tailored to enable the fan blade to withstand bird impacts while still delivering world class performance over full operating ranges.

Thus, fan blade design is provided for, but not limited to, an 81" fan blade assembly with 16 blades, an average span of 27 inches per fan blade, a fan duct pressure ratio of 1.38 and a tip speed of 1050 ft/sec at cruise conditions, which is made out of carbon composite material or other similar materials. This new fan blade design incorporates thickness and camber distributions that improve bird impact capability while minimizing aerodynamic performance debit. The fan blade is an airfoil that combines both a high maximum thickness distribution with a forward location of maximum thickness with increased thickness in the forward portion of the airfoil in order to reduce stresses in the front portion due to the bird impact. Equally important, the airfoil incorporates a highly tailored camber distribution over the whole airfoil, optimized in both the core and duct regions, in order to maximize flow capacities and the efficiency of the fan blade over entire operating envelopes. This is particularly relevant in the region of span that affects the flow going into the core stream, which is dependent on the bypass ratio for a particular application (in an exemplary case, the span affected is from 0% to approximately 18% span).

Figure 2:
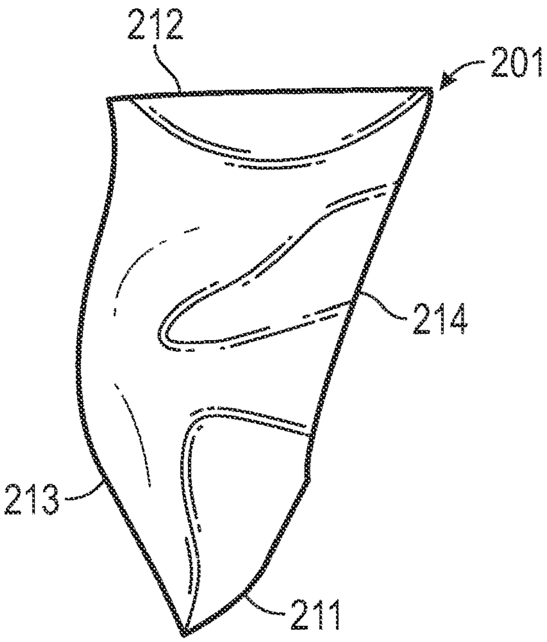
FIG. 2 is a perspective view of an airfoil section of a flan blade in accordance with embodiments.
Figure 3:
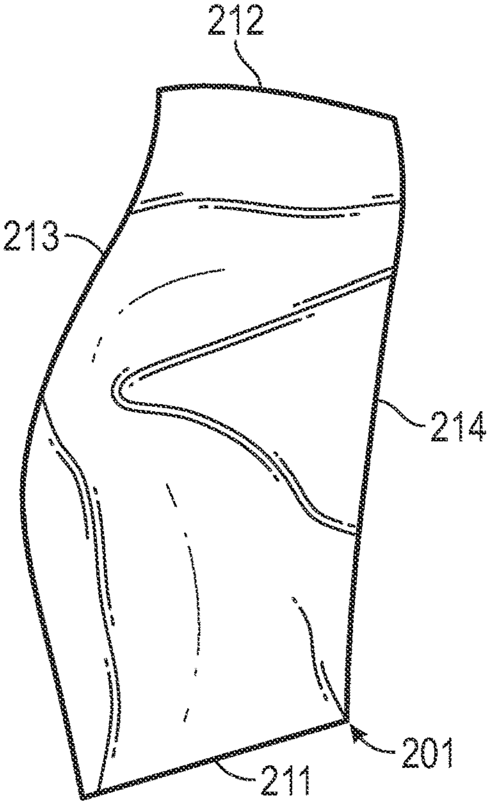
FIG. 3 is a side view of the airfoil section of FIG. 2 in accordance with embodiments.
Figure 4:
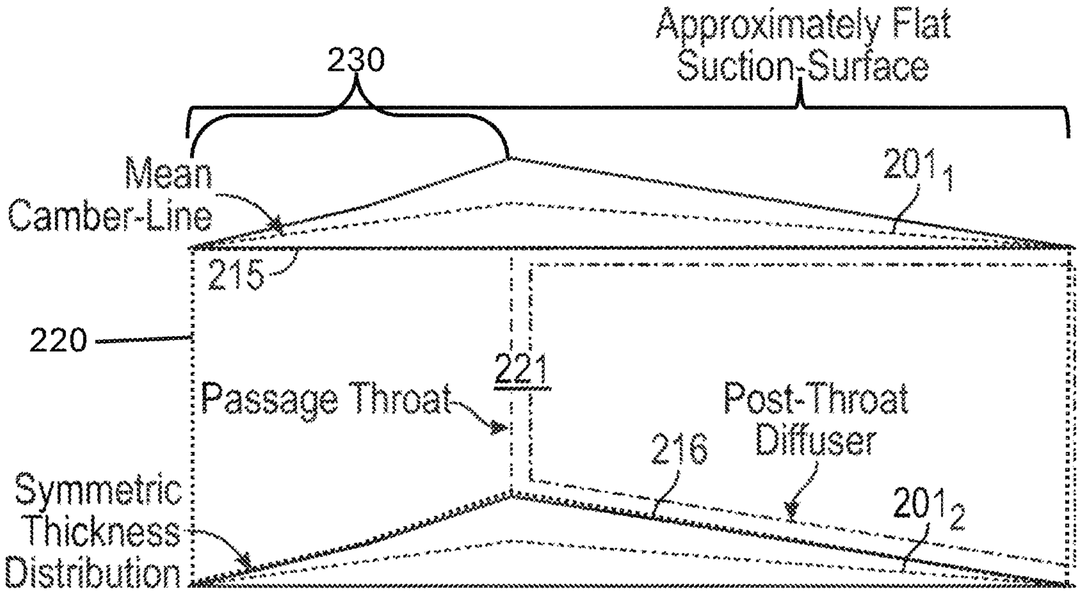
FIG. 4 is a schematic illustration of a flow passage formed by neighboring fan blades in accordance with embodiments.

With continued reference to FIG. 1 and with additional reference to FIGS. 2 and 3 and FIG. 4, a fan blade 201 is provided. FIGS. 2 and 3 are isometric and side views of a portion of the fan blade 201 that is configured to be disposed within a high-temperature and high-pressure flow path of, for example, a gas turbine engine, such as the gas turbine engine 20 of FIG. 1. FIG. 4 is an illustration of a pair of adjacent airfoils showing a pre-compression region, a passage throat and a flat suction-surface in the post-throat diffuser region.

As shown in FIGS. 2 and 3, the fan blade 201 includes a body 202 with an airfoil shaped section (hereinafter referred to as the "airfoil section") 210. The airfoil section 210 has a root 211, a tip 212, leading and trailing edges 213 and 214 that extend between the root 211 and the tip 212 and pressure and suction surfaces 215 and 216 (see FIG. 4).

As shown in FIG. 4, the fan blade 201 can be provided as a first fan blade $\mathbf{201}_1$ and a second fan blade $\mathbf{201}_2$ neighboring the first fan blade $\mathbf{201}_1$ with a throat region 220 interposed between the suction surface 216 of the first fan blade $\mathbf{201}_1$ and the pressure surface 215 of the second fan blade $\mathbf{201}_2$. The throat region 220 includes a passage throat 221 that is located at a minimum distance between the pressure surface 215 of the second fan blade $\mathbf{201}_2$ and the suction surface 216 of the first fan blade $\mathbf{201}_1$. In accordance with embodiments, the first and second fan blades $\mathbf{201}_1$ and $\mathbf{201}_2$ are configured such that a pre-compression region 230 is defined in the throat region 220 ahead of the passage throat 221 and each of the first and second fan blades $\mathbf{201}_1$ and $\mathbf{201}_2$ includes a mean camber line MCL defining a flattened suction surface. In addition, each of the first and second fan blades $\mathbf{201}_1$ and $\mathbf{201}_2$ includes an airfoil section that is defined on an axisymmetric surface with a symmetry axis of the surface aligned with a gas-path center-line axis and each of the first and second fan blades $\mathbf{201}_1$ and $\mathbf{201}_2$ has a symmetric thickness distribution with a single thickness maximum. This configuration maximizes flow-capacities and minimizes losses of the airfoil sections, while simultaneously maximizing a length of the passage 'diffuser' region between the passage throat 221 and the airfoil trailing-edges 213.

Figure 5:
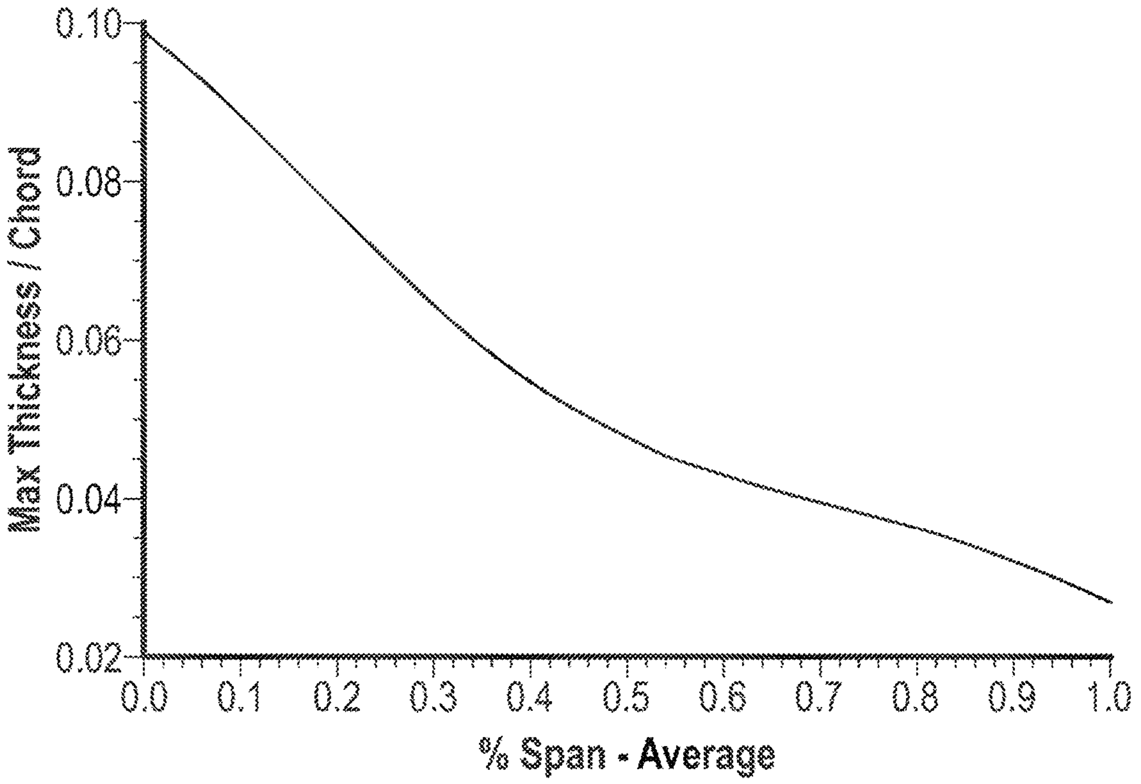
FIG. 5 is a graphical depiction of a range of thickness-over-chord (T/B) values of an airfoil section in accordance with embodiments.
Figure 6A:
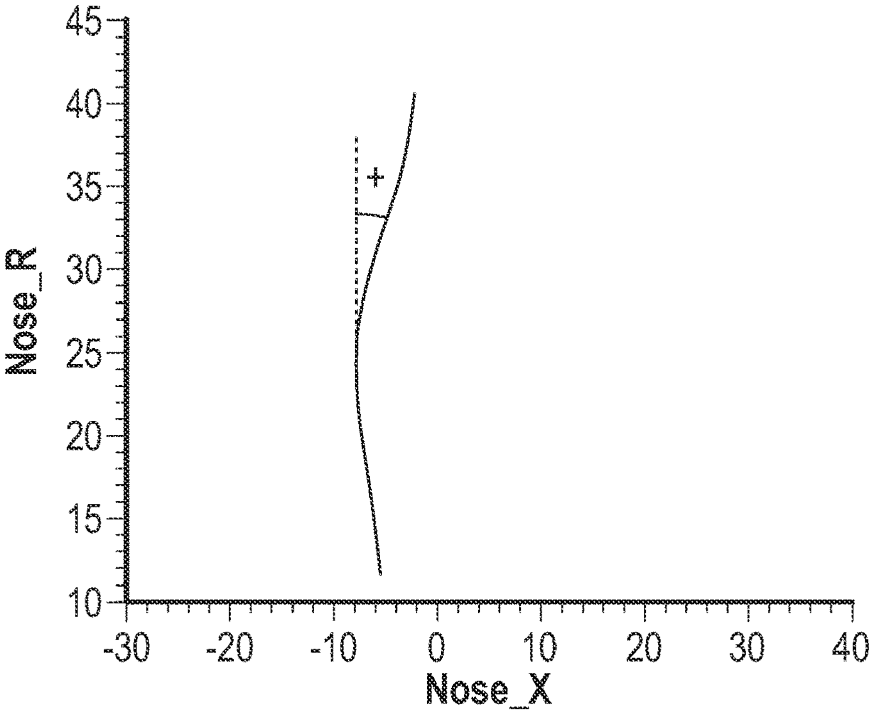
FIGS. 6A and 6B are graphical illustrations of radial leading edge angles of an airfoil section in accordance with embodiments.
Figure 6B:
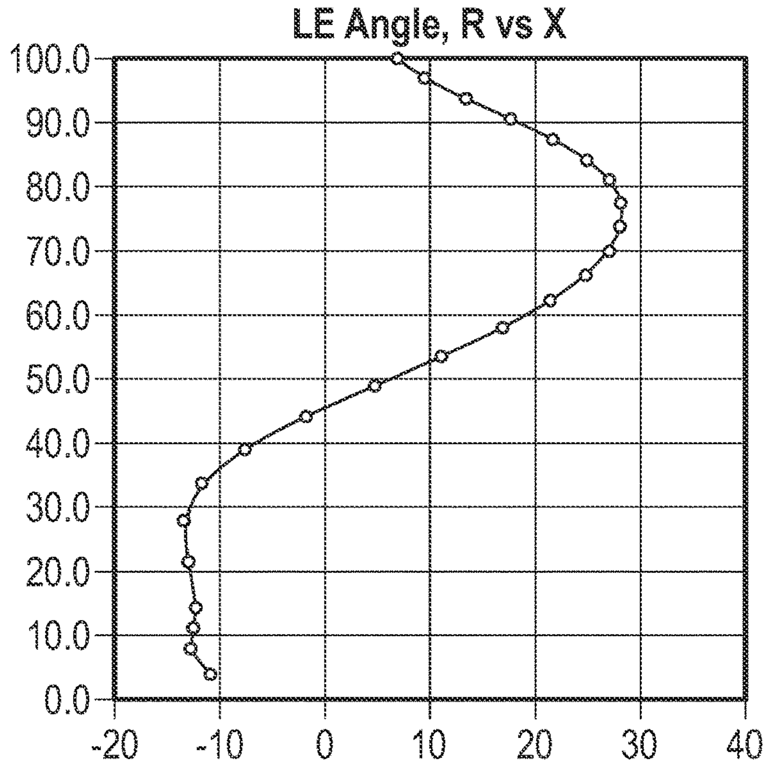
Figure 7A:
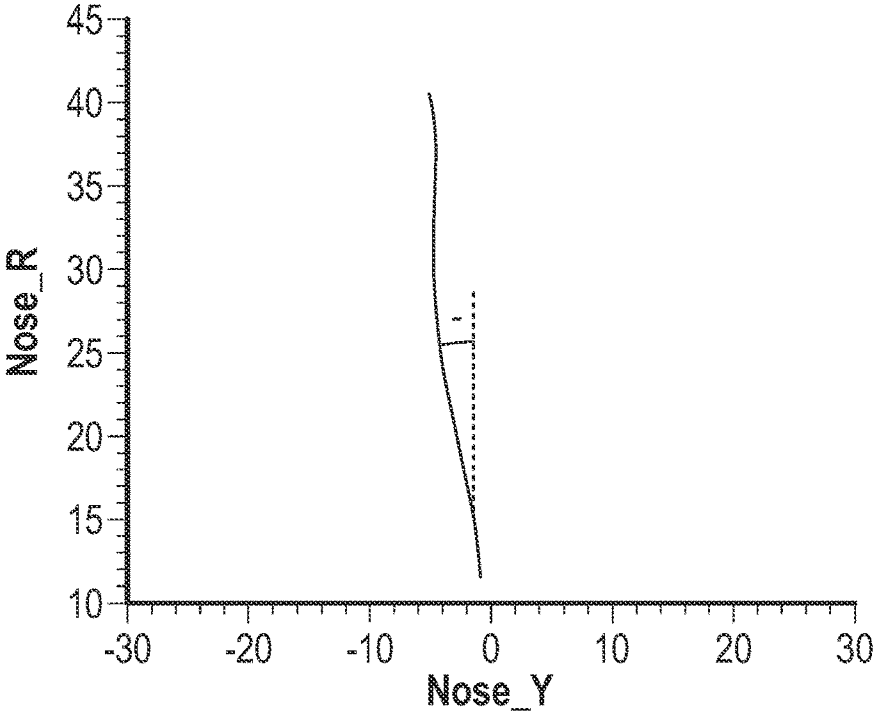
FIGS. 7A and 7B are graphical illustrations of radial leading edge angles of an airfoil section in accordance with embodiments.
Figure 7B:
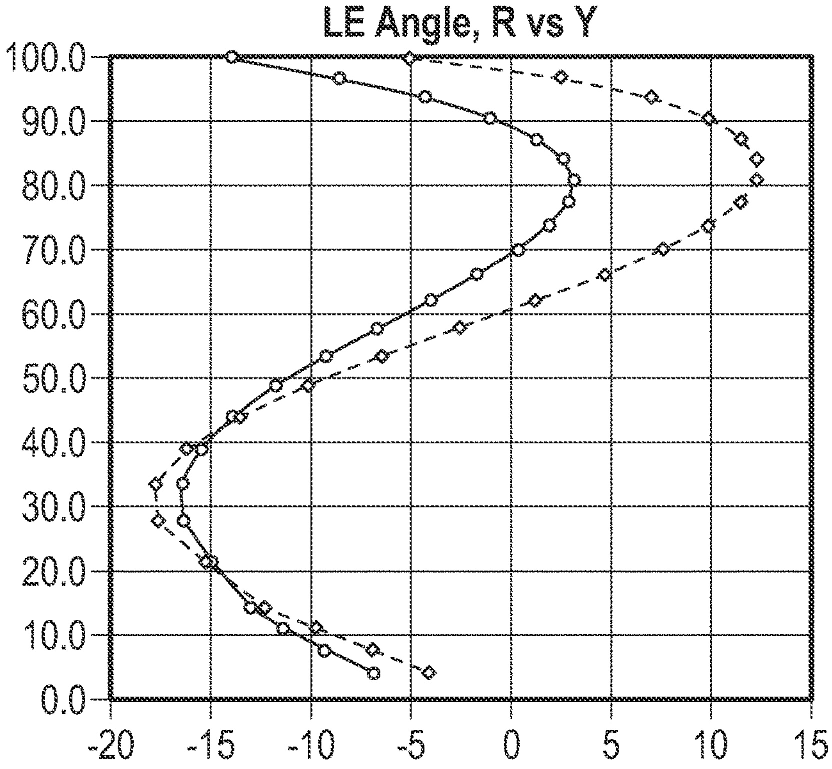
Figure 8:
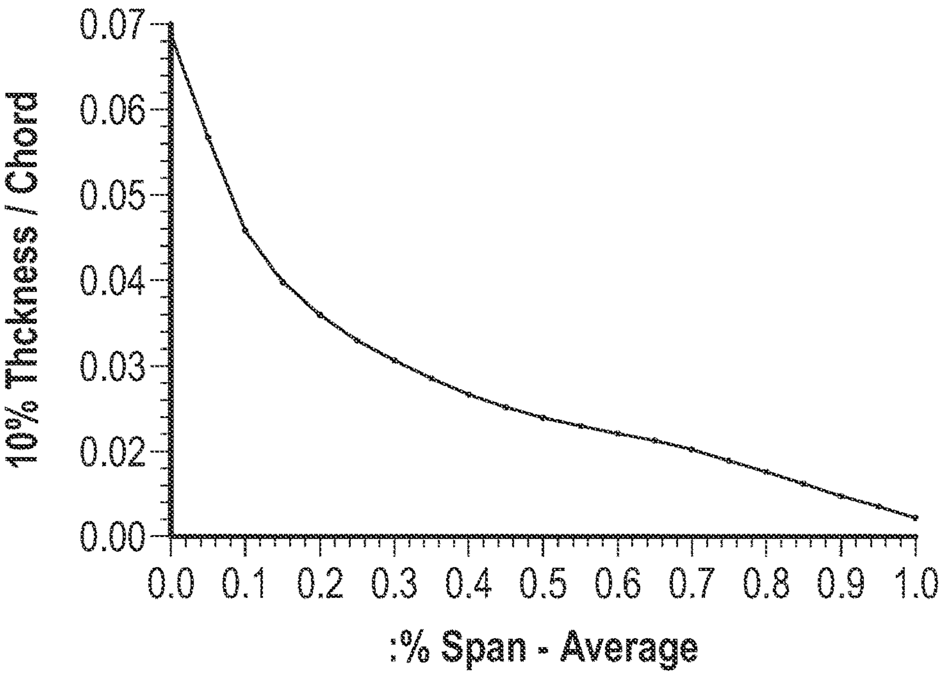
FIG. 8 is a graphical depiction of a leading edge thickness distribution of an airfoil section in accordance with embodiments.

FIG. 5 is a graphical plot of a maximum thickness versus chord distribution for a fan blade, such as the fan blade 201 of FIGS. 2 and 3. The graphical plot shows that the maximum thickness versus chord distribution is relatively reduced between 0 and 50% span and particularly in the region between 20% and 50% span. FIG. 6A is planar view of the leading edge (LE) of an airfoil (i.e., of fan blade 201) along the X-R plane and FIG. 6B is a plot of the angle of the LE on the X-R plane and illustrates that LE angle distribution in the X-R plane is correlated to bird impact capability of the blade (i.e., the fan blade 201). FIG. 7A is a planar view of the LE of the airfoil (i.e., of fan blade 201) along the Y-R plane and illustrates how angles that are plotted in FIG. 7B are calculated. FIG. 7B is a plot of the angle of the LE on the Y-R plane and illustrates that the LE angle distribution in the Y-R plane is correlated to the bird impact capability of the blade (i.e., the fan blade 201). FIG. 8 is a plot of a distribution of airfoil thickness at 10% chord divided by the total chord (i.e., for fan blade 201). FIG. 8 illustrates that a thickness in the front portion of the blade is relatively large particularly in the 0% to 90% span.

With reference to FIGS. 5-8, the airfoil section 210 exhibits a range of thickness-over-chord (T/B) values of approximately 0.0761 at about 20% span to approximately 0.0465 at about 50% span, an average location of max thickness (LMT) of approximately 0.3778 at about 0-20% span and an average of leading edge (LE) thickness at 10% chord-over-total chord of approximately 0.0494 at 0-20% span (values listed herein are calculated for values interrogated at 5% increments along a span of the airfoil 201; this regime will continue throughout the following description). More specifically, in about a 0%-20% span, the airfoil section 210 exhibits an average T/B of approximately 0.0887 (−8% to +8%), in about a 20%-50% span, the airfoil section 210 exhibits an average T/B of approximately 0.0596 (−8% to +8%), in about a 50%-90% span, the airfoil section 210 exhibits an average T/B of approximately 0.0394 (−8% to +8%) and in about a 90% to 100% span, the airfoil section 210 exhibits an average T/B of approximately 0.0296 (−8% to +8%). Further, in about a 0%-20% span, the airfoil section 210 exhibits an average LMT of approximately 0.378 (−8% to +8%), in about a 20%-50% span, the airfoil section 210 exhibits an average LMT of approximately 0.406 (−8% to +8%), in about a 50%-90% span, the airfoil section 210 exhibits an average LMT of approximately 0.478 (−8% to +8%), and in about a 90% to 100% span, the airfoil section 210 exhibits an average LMT of approximately 0.587 (−8% to +8%). Also, in about a 0%-20% span, the airfoil section 210 exhibits an average LE thickness of approximately 0.0494 (−12% to +12%), in about a 20%-50% span, the airfoil section 210 exhibits an average LE thickness of approximately 0.0292 (−5% to +10%), in about a 50%-90% span, the airfoil section 210 exhibits an average LE thickness of approximately 0.0198 (−5% to +10%), and in about a 90% to 100% span, the airfoil section 210 exhibits an average LE of approximately 0.0135 (−8% to +8%).

In accordance with further embodiments, an angle of the LE, as assessed between adjacent sections stacked radially upon each other, affects how the incoming bird is impacted (and, i.e., sliced) by the fan blade 201. For this fan blade 201, a first region of the airfoil section 210, which starts at about 35% span and extends to 75% span, but is not limited to these locations, is characterized in that the radial LE angle on a plane defined by X and R has increasing value from about a 25% (−5% to +5%) span to about a 75% (−5% to +5%) span (see FIG. 6A) with an inflection in the radial LE angle distribution at about 75% (−5% to +5%), but not limited to that location, above which there is a second region in which the radial LE angle decreases relative to the angle at about 75% (−5% to +5%) span (see FIG. 6B). Here, a positive angle is defined by two radially adjacent sections, and the upper section is axially aft of the lower section (see FIG. 6A). Additionally or alternatively, for the radial LE angle on a plane defined by Y and R, a region of the airfoil section 210 that starts at about 35% (−5% to +5%) span has an increasing radial angle to about 85% (−5% to +5%) span (see FIG. 7A) with an inflection in the radial LE angle distribution at about the 85% (−5% to +5%) span above which the radial LE angle decreases relative to the angle at about the 85% (−5% to +5%) span (see FIG. 7B). Here, a negative angle is defined by two radially adjacent sections, and the upper section is farther into the direction of rotation relative to the lower section (see FIG. 6A).

The radial LE angles affect bird impact capability because the non-uniform radial LE shape profile allows a varying amount of blade material to cut into the bird, with varying amounts of energy transferred from the bird to the blade. Also, the force at the impact location is distributed in three coordinate directions due to the angled LE shape profile, and dissipates the energy into more advantageous areas of the airfoil.

With reference to FIG. 8, the airfoil section 210 also exhibits a thickness-to-chord value at a 10% chord location at about 0% LE span of approximately 0.0688 (−15% to +15%), which tapers to approximately 0.0442 (−12% to +12%) at 11% LE span.

In addition, the airfoil section 210 exhibits a chord distribution that has an inflection point between about 50% and about 70% span, the inflection point having a magnitude approximately 1.45-1.55 times a magnitude of the chord at 0% span, and approximately 1-1.1 times a magnitude of the chord at 100% span.

Figure 9A:
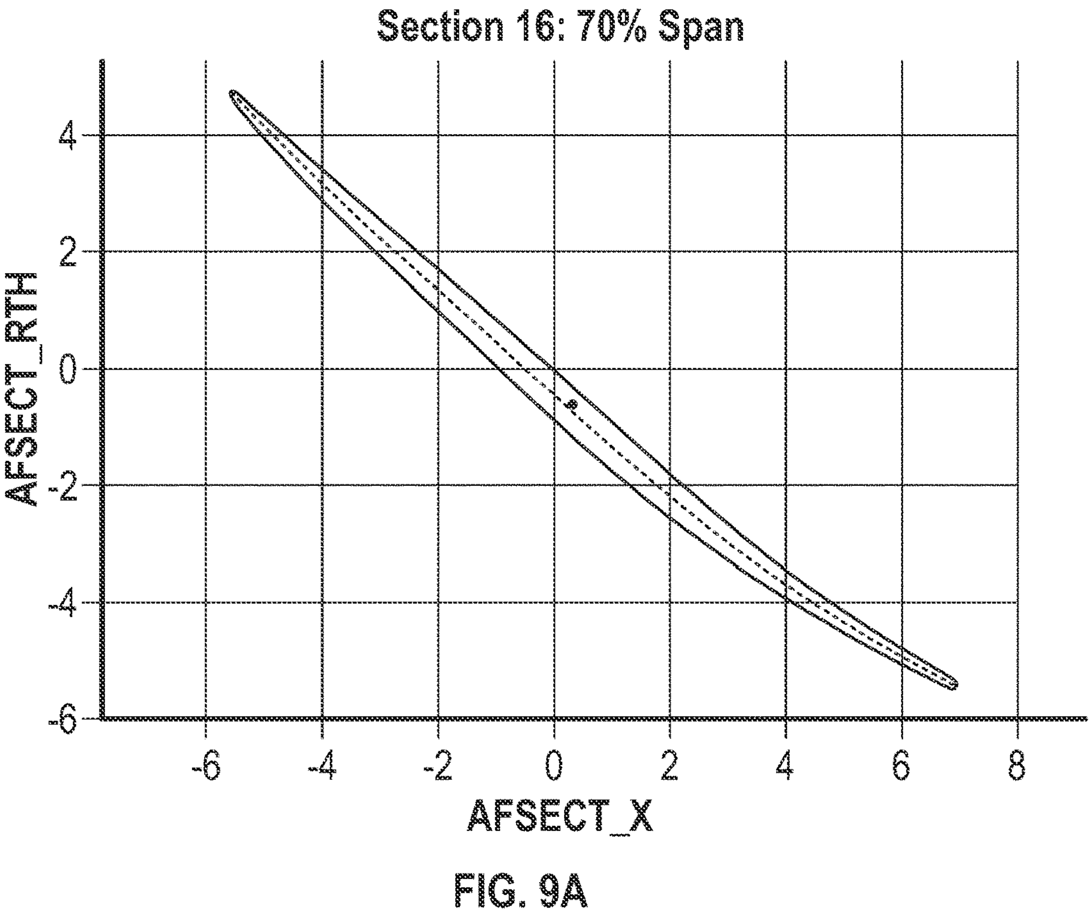
FIGS. 9A-9C illustrate a custom tailored airfoil to compensate for the required increases in airfoil thickness for impact-damage resistance while minimizing the negative effects of this thickness on the airfoil aerodynamics in accordance with embodiments.
Figure 9B:
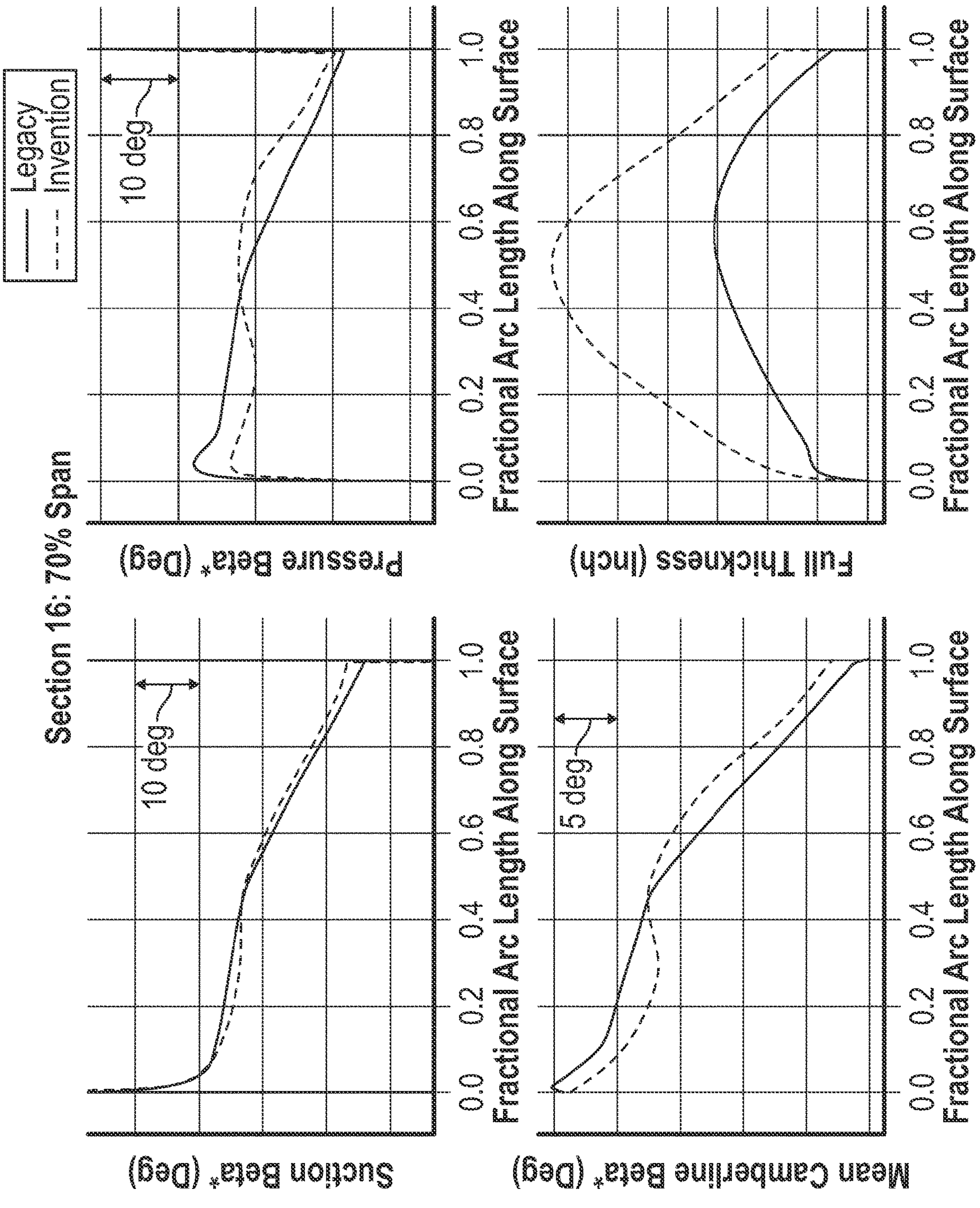
Figure 9C:
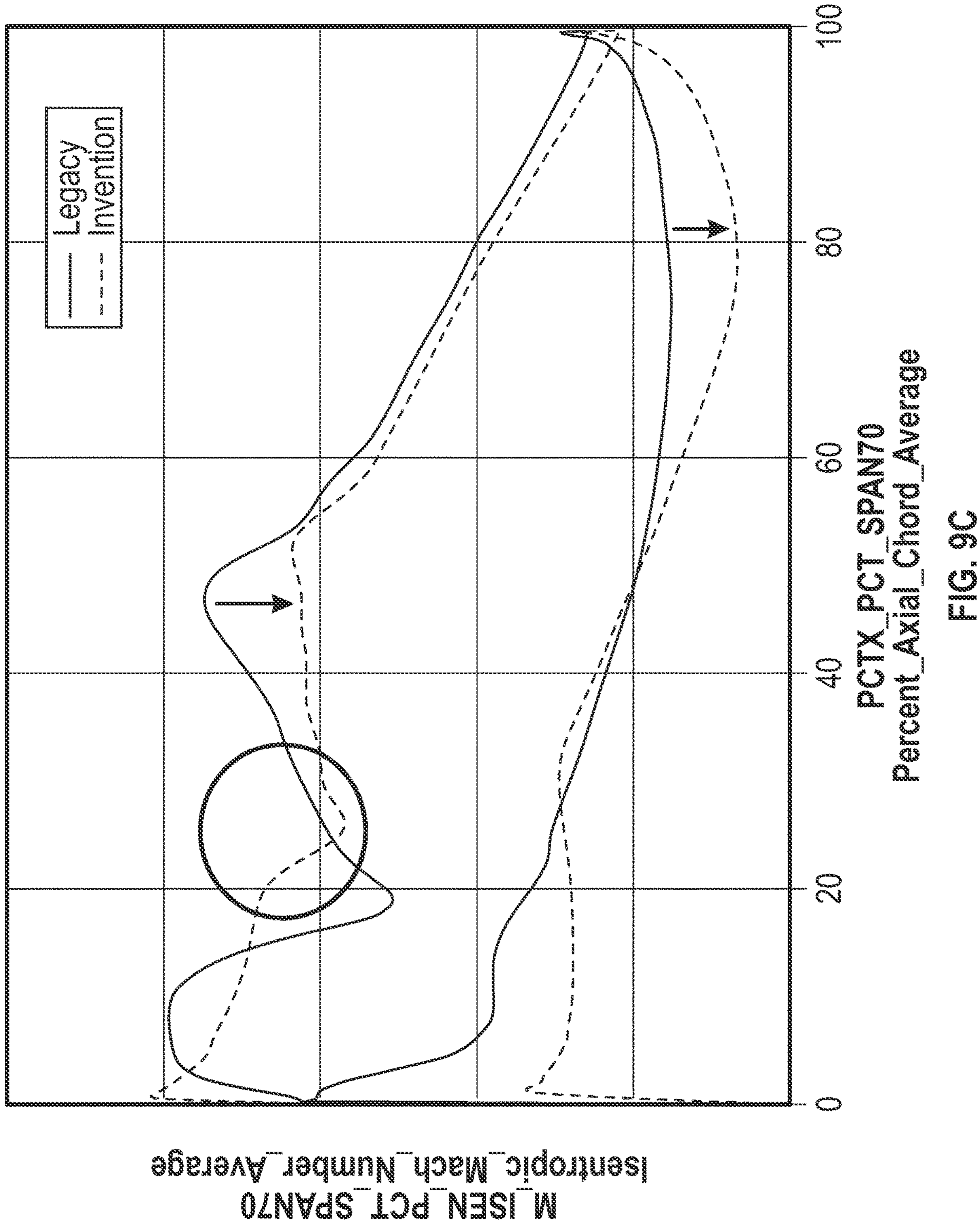

FIG. 9A is a plot of an airfoil (i.e., of fan blade 201) cross section in a transonic region of the airfoil and illustrates droop and flatness of the suction surface over the front portion of the airfoil as well as nearby a maximum thickness location on the airfoil the suction side surface remains flat but the pressure side surface deflects outwards as it accommodates increased thickness. FIG. 9B are plots of the metal angle distribution of the suction side, meanline and pressure side of the airfoil shown in FIG. 9A and illustrate a bump on the suction-side angle distribution near 40% chord of the airfoil as well as the nearly linear suction-side angle distribution in the aft portion of the airfoil. In addition, the thickness distribution over the chord of this airfoil section is also shown in the lower right plot, which shows that the airfoil has considerably increased thickness particularly in the front portion of the airfoil and at the max thickness location. FIG. 9C illustrates a corresponding predicted isentropic Mach number distribution over the surface of the airfoil section of FIG. 9A.

With reference to FIGS. 9A, 9B and 9C and in accordance with embodiments, the airfoil section 210 can be tailored, especially in a sensitive transonic region of the airfoil span, to compensate for required increases in airfoil thickness for impact-damage resistance while minimizing negative effects on aerodynamics. Such a tailored airfoil section 210 is illustrated in FIGS. 9A and 9B with a resultant surface isentropic mach-number loading plot illustrated in FIG. 9C, computed at the airfoil aerodynamic design point.

As shown in FIG. 9B in particular, the airfoil suction surface exhibits droop over the first 5% of airfoil chord, after which the suction surface metal-angle distribution is kept approximately flat, up to approximately −5% of the chord location where the adjacent airfoil ‘covers’ the airfoil. Following the flat suction-surface region, the suction-surface metal-angle distribution exhibits a nearly constant-angle region between −5% & +5% of the airfoil covered-passage starting position. Following the nearly constant-angle region, the suction-surface metal-angle distribution is approximately linear, except at the front and endpoints of this region where the linear section blends into the nearly constant-angle region and trailing-edge locations respectively. With the desired suction-surface now achieved, the thickness distribution is applied such that the increase in section maximum-thickness is evidenced on the pressure-surface only. The chordwise location of section maximum-thickness is positioned as optimally as possible to balance the favorable effect of moving the chordwise location of section maximum-thickness closer to the leading-edge for impact-damage resistance, versus the unfavorable effect moving the chordwise location of section maximum-thickness forward has on airfoil operating range, loss and shock-boundary-layer interaction (if a shock is present). The combination of the features described herein creates a pressure-surface metal-angle distribution that displays a pronounced concave distribution between the position of maximum-thickness and the trailing-edge as shown in FIG. 9B.

As additional embodiments, the airfoil section 210 is formed to create a slight pre-compression region before the airfoil passage shockwave as shown in the circled feature in the Mach-number plot of FIG. 9C. Here, pre-compression acts to slightly reduce the pre-shock Mach number thus reducing airfoil loss and making shock-boundary-layer-interaction less likely. The combination of the features described herein result in a concavity that transfers loading (difference in suction versus pressure surface Mach-number, or equivalently static-pressure) from the suction-surface to the pressure-surface, as indicated by the two downward pointing arrows in FIG. 9C at approximately 45% and 80% of airfoil chord respectively.

The transfer of the airfoil loading in this manner allows the airfoil to accommodate increased airfoil thickness requirements, without compromising sensitive suction-surface aerodynamics. Transferring the loading to the pressure-surface aft region also helps to reduce airfoil profile loss, as the equivalent loading is occurring at a lower overall passage Mach number (profile losses scale with the cube of the boundary-layer edge velocity, so small reductions in the boundary-layer-edge velocity can yield useful gains in loss reduction).

The resultant effect of these geometric features in combination is an efficient airfoil section 210 and a resulting blade passage that exhibits low loss and high stalling static-pressure-rise capability. It also suppresses the formation of passage loss cores, when the trailing-edge mean camber line metal-angle is below ~7 degrees or greater than ~20 degrees.

Benefits of the features described herein are the provision of a fan blade in which a thickness distribution and a tailored camber distribution are incorporated into the fan blade design allowing for the fan blade to be made out of a composite material and remain competitive for aerodynamic performance. The thickness distribution reduces tensile and compressive stresses experienced during a bird impact event, while the camber distribution enables world-class performance by minimizing the pressure and shock losses, therefore maximizing efficiency.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan blade of a gas turbine engine, comprising:
a body having an airfoil shape and exhibiting:
a range of thickness-over-chord (T/B) values of 0.0761 at 20% span to 0.0465 at 50% span,
an average location of max thickness (LMT) of 0.3778 at 0-20% span, and
an average of leading edge (LE) thickness at 10% chord-over-total chord of 0.0494 at 0-20% span.

2. The fan blade according to claim 1, wherein:
in a 0%-20% span, the airfoil shape exhibits an average T/B of 0.0887 (−8% to +8%),
in a 20%-50% span, the airfoil shape exhibits an average T/B of 0.0596 (−8% to +8%),
in a 50%-90% span, the airfoil shape exhibits an average T/B of 0.0394 (−8% to +8%), and
in a 90% to 100% span, the airfoil shape exhibits an average T/B of 0.0296 (−8% to +8%).

3. The fan blade according to claim 1, wherein:
in a 0%-20% span, the airfoil shape exhibits an average LMT of 0.378 (−8% to +8%),
in a 20%-50% span, the airfoil shape exhibits an average LMT of 0.406 (−8% to +8%),
in a 50%-90% span, the airfoil shape exhibits an average LMT of 0.478 (−8% to +8%), and
in a 90% to 100% span, the airfoil shape exhibits an average LMT of 0.587 (−8% to +8%).

4. The fan blade according to claim 1, wherein:
in a 0%-20% span, the airfoil shape exhibits an average LE thickness at 10% chord-over-total chord of 0.0494 (−12% to +12%),
in a 20%-50% span, the airfoil shape exhibits an average LE thickness at 10% chord-over-total chord of 0.0292 (−5% to +10%),
in a 50%-90% span, the airfoil shape exhibits an average LE thickness at 10% chord-over-total chord of 0.0198 (−5% to +10%), and
in a 90% to 100% span, the airfoil shape exhibits an average LE thickness at 10% chord-over-total chord of 0.0135 (−8% to +8%).

5. The fan blade according to claim 1, wherein the airfoil shape exhibits an increasing radial LE angle from a 25% (−5% to +5%) span to a 75% (−5% to +5%) span.

6. The fan blade according to claim 5, wherein the airfoil shape exhibits an inflection in the radial LE angle at the 75% (−5% to +5%) span above which the radial LE angle decreases.

7. The fan blade according to claim 1, wherein the airfoil shape exhibits an increasing radial LE angle from a 35% (−5% to +5%) span to a 85% (−5% to +5%) span.

8. The fan blade according to claim 7, wherein the airfoil shape exhibits an inflection in the radial LE angle at the 85% (−5% to +5%) span above which the radial LE angle decreases.

9. The fan blade according to claim 1, wherein the airfoil shape exhibits a thickness-to-chord value at a 10% chord location at 0% LE span of 0.0688 (−15% to +15%), which tapers to 0.0442 (−12% to +12%) at 11% LE span.

10. The fan blade according to claim 1, wherein the airfoil shape exhibits a chord distribution that has an inflection point between 50% and 70% span, the inflection point having a magnitude 1.45-1.55 times a magnitude of the chord at 0% span, and 1-1.1 times a magnitude of the chord at 100% span.

* * * * *